(12) United States Patent
Previte

(10) Patent No.: US 6,886,895 B2
(45) Date of Patent: May 3, 2005

(54) SECURITY LOCKER FOR COMPUTER EQUIPMENT

(75) Inventor: Anthony Previte, New York, NY (US)

(73) Assignee: Globix Corporation, New York, NY (US)

(*) Notice: Subject to any disclaimer, the term of this patent is extended or adjusted under 35 U.S.C. 154(b) by 0 days.

(21) Appl. No.: 09/865,027

(22) Filed: May 24, 2001

(65) Prior Publication Data

US 2002/0003388 A1 Jan. 10, 2002

Related U.S. Application Data

(60) Provisional application No. 60/206,826, filed on May 24, 2000.

(51) Int. Cl.[7] .............................................. A47B 81/00
(52) U.S. Cl. ..................................... 312/213; 52/79.1
(58) Field of Search .......................... 312/257.1, 265.1, 312/265.2, 265.3, 265.4, 265.5, 265.6, 263, 210, 213; 52/79.1; 211/26, 180, 189

(56) References Cited

U.S. PATENT DOCUMENTS

| | | | | | |
|---|---|---|---|---|---|
| 507,991 | A | * | 11/1893 | Bullock | 312/213 |
| 726,555 | A | * | 4/1903 | Mayer | 312/213 |
| 2,404,065 | A | * | 7/1946 | Hill | 206/521.1 |
| 2,523,121 | A | * | 9/1950 | Klein | 312/213 |
| 2,774,808 | A | * | 12/1956 | Bullock | 312/213 X |
| 3,832,605 | A | * | 8/1974 | Clark, Jr. | 312/257.1 X |
| 4,550,545 | A | * | 11/1985 | Schulz | 52/783.17 |
| 4,843,788 | A | * | 7/1989 | Gavin et al. | 52/79.1 X |
| 5,183,320 | A | * | 2/1993 | Chen | 312/213 X |
| 5,639,150 | A | * | 6/1997 | Anderson et al. | 312/265.3 |
| 6,039,414 | A | * | 3/2000 | Melane et al. | 312/223.1 X |
| 6,149,254 | A | * | 11/2000 | Bretschneider et al. | 312/223.1 |

FOREIGN PATENT DOCUMENTS

| | | | | |
|---|---|---|---|---|
| DE | 100317 | * | 1/1898 | 312/213 |
| GB | 22471 | * | of 1913 | 312/213 |

* cited by examiner

*Primary Examiner*—James O. Hansen
(74) *Attorney, Agent, or Firm*—Darby & Darby

(57) ABSTRACT

A security locker for expensive and/or confidential computer equipment, such as servers and the like. The security locker includes four side walls, a ceiling assembly, and a floor. One of the side walls includes at least one door to provide access to the interior of the locker. A number of the side walls include ventilation segments comprising a plurality of spaced apart, small openings. Preferably, the openings are located adjacent the tops of the respective side walls to prevent people from viewing the interior of the locker. The ceiling assembly also includes a plurality of relatively small, spaced apart openings to provide proper ventilation for the equipment contained within the locker. Inside of the locker, one or more vertical mounting stations are provided for secure mounting of computer equipment thereto in a well-known manner.

14 Claims, 7 Drawing Sheets

(3 of 7 Drawing Sheet(s) Filed in Color)

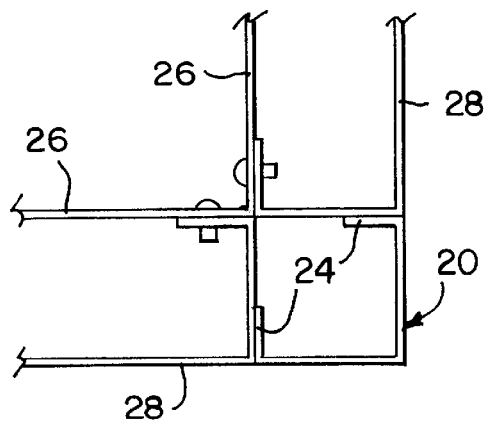
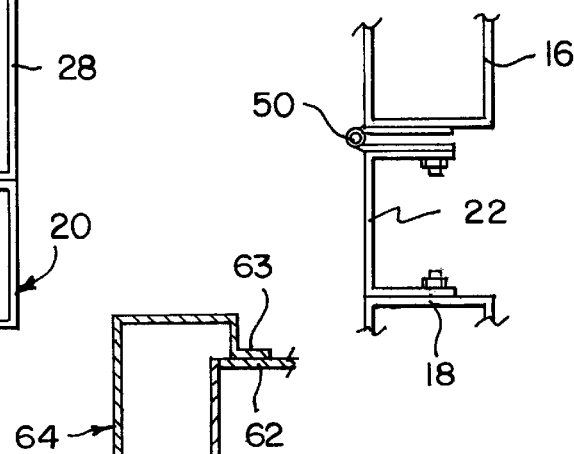
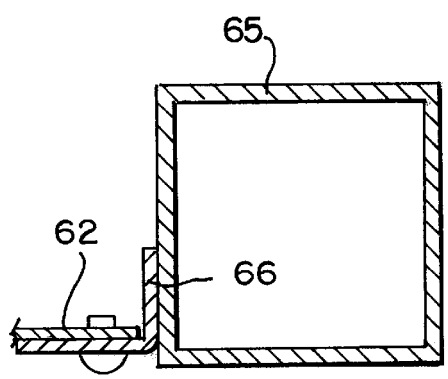
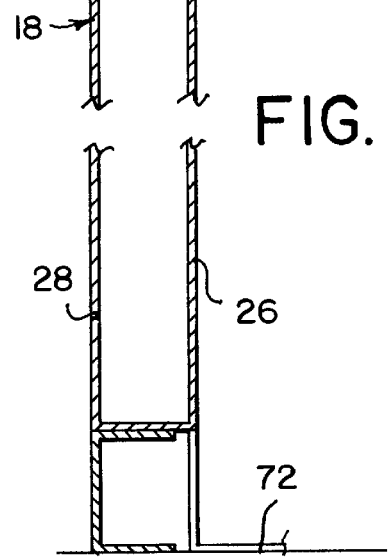
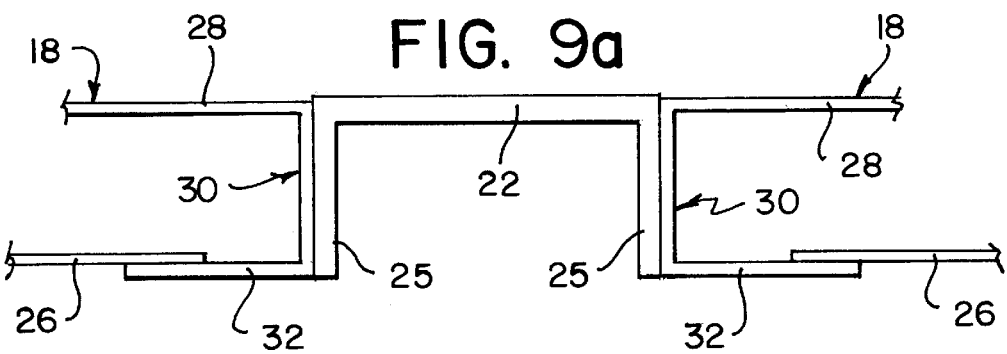

FIG. 16

Bill of Material 8 x 7

| Item | Qty. Globox-1 | Qty. Globox-2 | Qty. Globox-3 | Qty. Globox-4 | Description |
|---|---|---|---|---|---|
| 1 | 2 | 2 | – | – | Top Support Front & Rear |
| 2 | 2 | 2 | – | – | Top Support Left & Right |
| 3 | 4 | 4 | – | – | Corner Post |
| 4 | 2 | 2 | – | – | Bottom Support Left & Right |
| 5 | 1 | – | – | 1 | Bottom Left Rear Support |
| 6 | 1 | – | – | 1 | Bottom Right Rear Support |
| 7 | 1 | – | 1 | – | Door Support Left |
| 8 | 1 | – | 1 | – | Door Support Right |
| 9 | 14 | 10 | – | – | Corner Support Bracket |
| 10 | 2 | – | 2 | – | Door Support Corner Bracket |
| 11 | 2 | 2 | – | – | Roof Support Left & Right |
| 12 | 1 | 1 | – | – | Roof Support Center |
| 13 | 4 | 4 | – | – | Roof Panel Perforated |
| 14 | 1 | – | – | 1 | 8712 Rear Panel with Vent Pattern |
| 14A | 1 | – | – | 1 | 8712-A Inner Panel with Vent Pattern |
| 15 | 6 | 4 | – | 2 | 8741 Side Panel with Vent Pattern |
| 15A | 6 | 4 | – | 2 | 8741-A Inner Panel with Vent Pattern |
| 16 | 2 | – | 2 | – | 8726 Front Panel with Vent Pattern |
| 16A | 2 | – | 2 | – | 8726-A Inner Panel with Vent Pattern |
| 17 | 1 | – | 1 | – | Door Right with Logo and Vent Pattern |
| 18 | 1 | – | 1 | – | Door Left with Logo and Vent Pattern |

SECURITY LOCKER FOR COMPUTER EQUIPMENT

CROSS-REFERENCE TO RELATED APPLICATION

This application claims priority under 35 U.S.C. §120 from U.S. Provisional Application No. 60/206,826, filed May 24, 2000, the entire disclosure of which is incorporated by reference herein.

FIELD OF THE INVENTION

The present invention relates to a storage enclosure and, more particularly, to a security locker for securely housing computer and/or communication equipment such as network servers, repeaters, and the like.

BACKGROUND OF THE INVENTION

Computers are playing an ever-increasing role in everyday life. Many people have home computers, and many businesses have elaborate, complex computer networks. In addition, with the expanding role of the Internet, many companies have dedicated servers to allow access by their employees to the world wide web, as well as to maintain a presence on the world wide web.

It is desirable to prevent unauthorized access to such network equipment for various reasons. For one, the equipment can be quite expensive, and therefore there exists the risk that unattended equipment will be stolen or otherwise tampered with. In addition, some of the equipment is proprietary, such that any form of access to the equipment by unauthorized individuals may reveal technology secrets which may directly affect competition in the marketplace.

For those and other reasons, the network equipment of a particular company is typically stored in one or more secure rooms at the company's facilities. However, this is often not an efficient use of the space, as the equipment may not occupy an entire room. In addition, the room is often not centrally located, and therefore accessibility to the equipment is not optimal. Furthermore, since the equipment is typically massive and generates a large amount of heat, proper ventilation must exist in the room.

Alternatively, the network equipment may be stored at off-site locations, known as "server farms", owned and operated by independent vendors. Unfortunately, at these server sites, it is likely that many servers from different companies will occupy a common room, exposing each server to potential tampering or otherwise unauthorized and uncontrolled access.

Accordingly, there is a need for a secure locker for housing computer equipment (e.g., a server) which is easily adaptable to efficiently house a variety of equipment of differing types and sizes in a protective and secure manner.

SUMMARY OF THE INVENTION

Briefly, and in general terms, the present invention is directed to a security locker for expensive and/or confidential computer equipment, such as network servers, communication equipment, and the like. The present invention is in the form of an enclosure including four side walls, a ceiling assembly, and a floor. One of the side walls includes at least one door to provide access to the interior of the locker. A number of the side walls include ventilation segments comprising a plurality of spaced apart, small openings. Preferably, the openings are located adjacent the tops of the respective side walls to prevent people from viewing the interior of the locker. The ceiling assembly also includes a plurality of relatively small, spaced apart openings to provide proper ventilation for the equipment contained within the locker. Inside of the locker, one or more vertical mounting stations are provided for secure mounting of computer equipment thereto in a well-known manner.

Thus, according to one illustrative embodiment of the invention, the present invention is directed to a security locker for computer equipment, including a floor, a pair of side walls extending upwardly from the floor, a pair of end walls extending upwardly from the floor, where at least one of the side walls and end walls includes a ventilation section adjacent the upper end thereof, a ceiling connected to the respective side and end walls, and at least one mounting station connected to the floor and ceiling to securely mount computer equipment thereon.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Other objects, features and advantages of the invention discussed in the above summary of the invention will be more clearly understood from the following detailed description of preferred embodiments, which are illustrative only, when taken together with the accompanying drawings in which:

FIG. 8 is a top plan view of one corner of the locker of FIG. 1;

FIG. 9 is a top plan view, in enlarged scale, of a hinge included in the locker of FIG. 1;

FIG. 9a is a top plan view of a wall post connected to two panels;

FIG. 11 is a cross-sectional view of a portion of the ceiling assembly;

FIG. 12 is a cross-sectional view of one end wall of the locker of FIG. 1;

FIG. 16 is a chart of materials in connection with FIGS. 13–15.

DETAILED DESCRIPTION OF THE PREFERRED EMBODIMENTS

Figure 1:
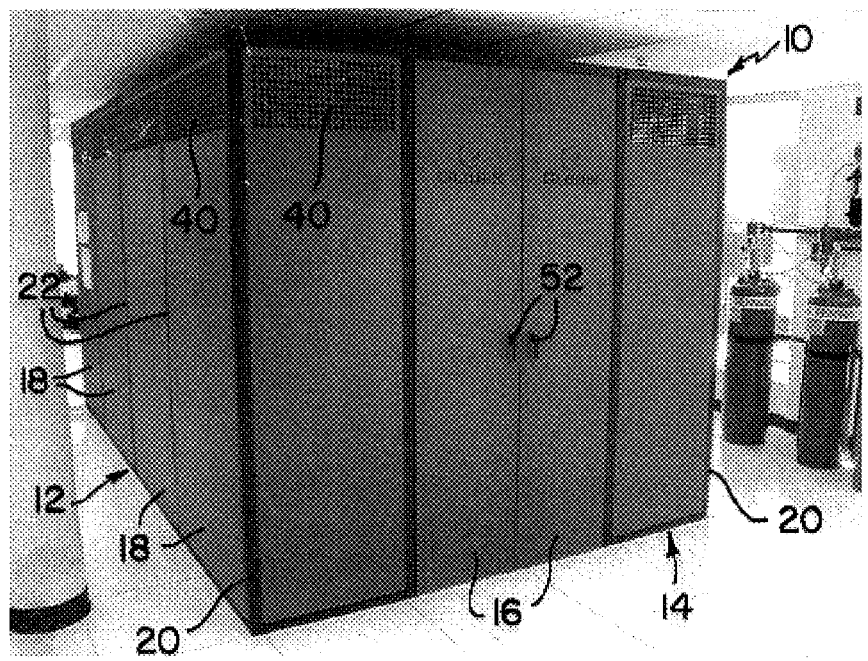
FIGS. 1 and 1A are perspective views of a security locker according to one embodiment of the present invention.
Figure 1A:
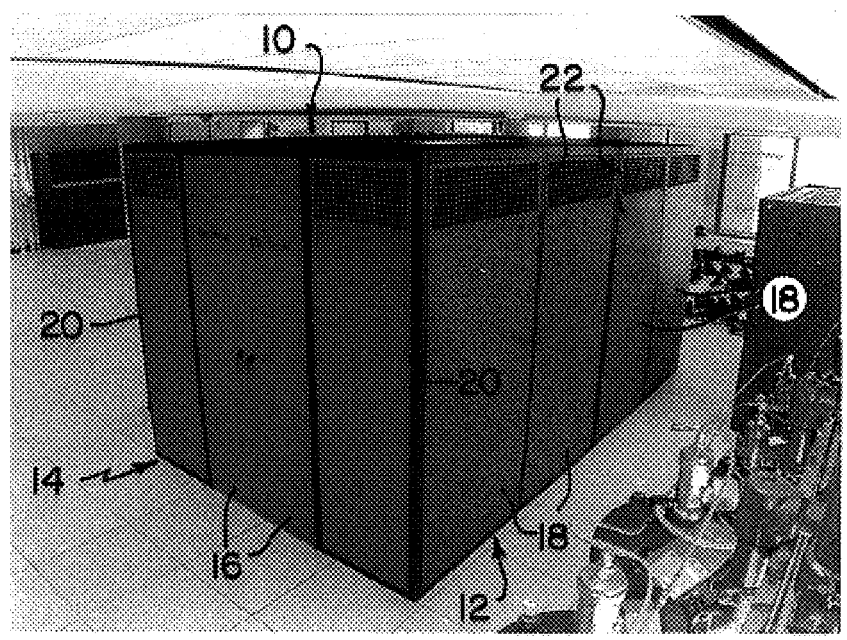
Figure 2:
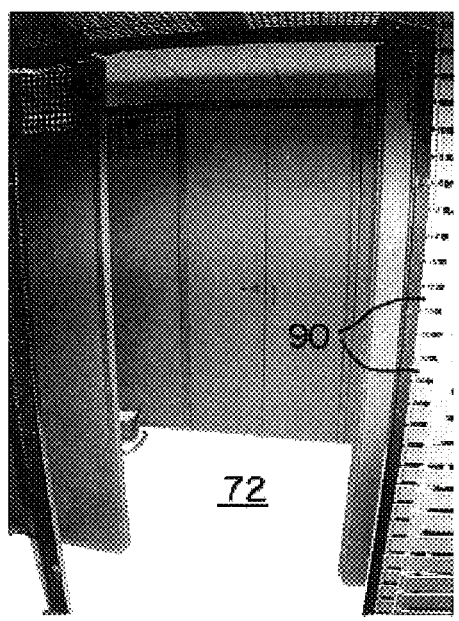
FIG. 2 is a side elevation view of the locker of FIG. 1 with one of the doors open.
Figure 3A:
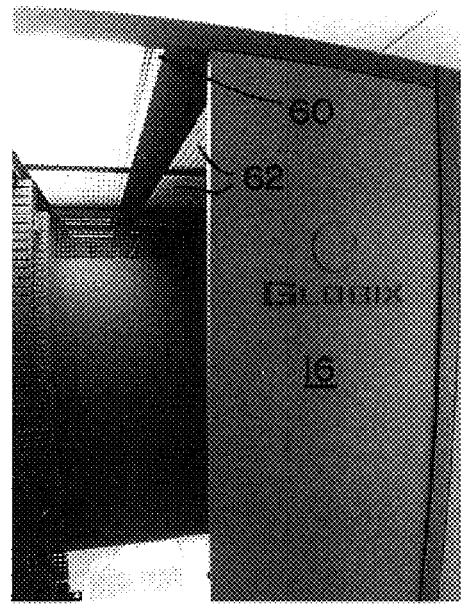
FIGS. 3 and 3A are elevation views of the interior of the locker of FIG. 1.
Figure 3:
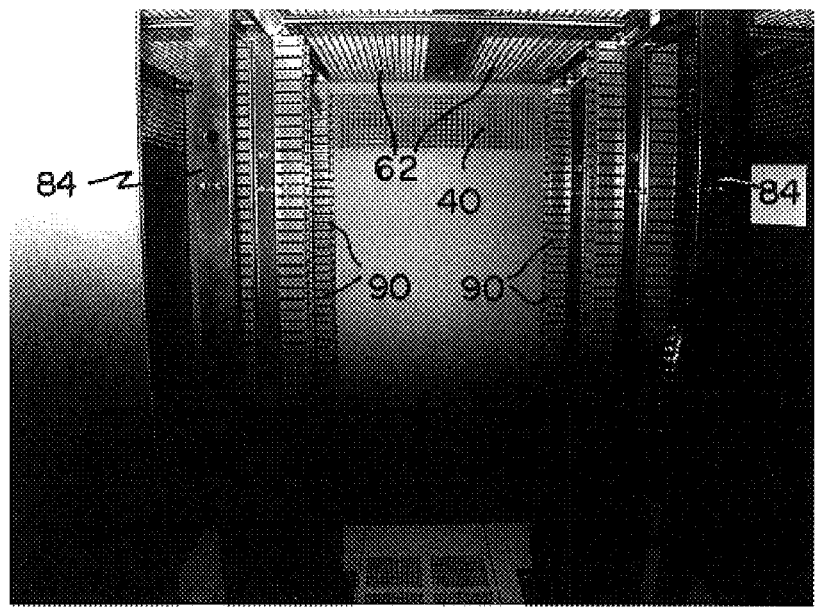

Referring now to FIGS. 1 and 1A, there is shown a security locker 10 for securely storing various computer equipment, for example, servers and the like, according to one illustrative embodiment of the invention. The locker includes a pair of side walls 12 (one of which is shown in FIG. 1), and a pair of end walls 14 (one of which is shown in FIG. 1). One of the end walls 14 includes a pair of doors 16, at least one of which may be pivoted to an open position (FIG. 2) to provide access to the interior of the locker 10.

The side walls 12 and end walls 14 each include a plurality of panels 18 interconnected by respective upstanding corner posts 20 and spaced apart wall posts 22 (FIGS. 1 and 8). As is shown in detail in FIG. 8, the corner posts 20 include a pair of mounting flanges or mounting surfaces 24 for engagement with the adjacent panels 18 in any suitable manner, such as with bolts and nuts through appropriate openings formed in the mounting flanges, or the like. The wall posts 22 are generally U-shaped in cross-section to provide similar mounting flanges 25 to connect to the adjacent panels 18 in a similar fashion (FIG. 9A).

As is shown in FIG. 8, in one illustrative embodiment the panels 18 include inner skins 26 and outer skins 28. The outer skins 28 are generally planar, and include generally L-shaped distal ends 30 that define mounting flanges 32 for secure engagement to the ends of the corresponding inner skin 26 in any suitable manner, for example, with bolts and nuts or any other suitable fastening method.

Figure 6A:
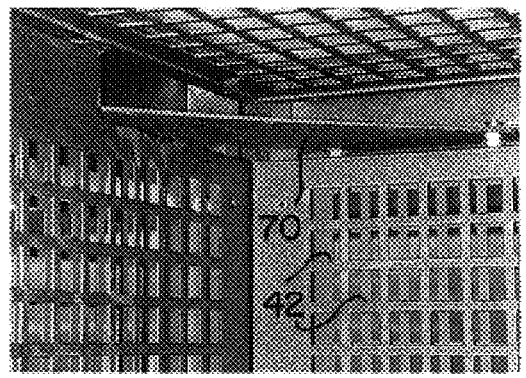
FIGS. 6 and 6A are perspective views of an upper inside corner of the locker of FIG. 1.
Figure 6:
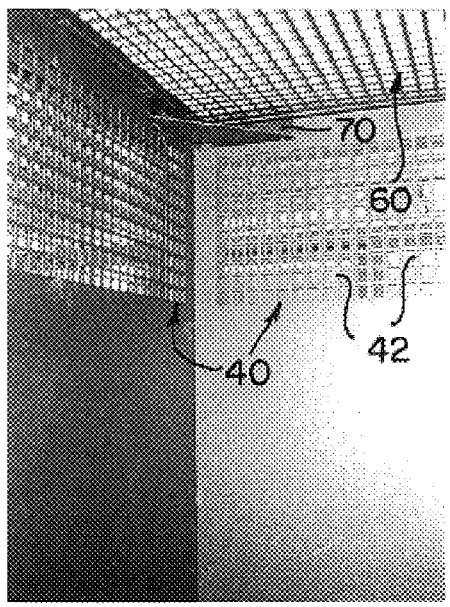

Referring to FIGS. 1 and 6, the inner and outer skins 26 and 28 include perforated sections 40 disposed adjacent the upper ends of the respective skins. The perforated sections include a plurality of openings 42 arranged in linear columns and rows to define a grid of the panel material between the respective openings. In one illustrative embodiment, the openings in the inner and outer skins are substantially aligned to permit viewing directly through the openings, but to prevent viewing through the openings at an angle. The openings in the opposing skins also can be offset from each other. In this manner, with the openings located adjacent the top of the locker 10, the view through the openings is substantially impaired if one attempts to look down into the lower portion of the locker, where the computer equipment is typically located.

The end wall 14 includes the doors 16, one of which is connected by a hinge 50 to the adjacent wall post 22 (FIG. 9). In one embodiment, the hinge is a 3" mild steel continuous hinge. It will be apparent to those skilled in the art that any suitable hinge may be used. As is shown in FIG. 1, each door includes a handle 52, at least one of which may be rotated between latched and unlatched positions. A locking mechanism is provided (not shown), and is connected to one of the handles. The locking mechanism can take any suitable form, and preferably includes door locking rods that extend into appropriate holes in the floor of the locker 10, and which are withdrawn out of the holes when the handle is rotated to the unlatched position.

It will also be apparent to those skilled in the art that the security locker 10 of the present invention may be designed having virtually any dimensions to accommodate the computer equipment at a facility. Moreover, existing lockers 10 are readily expandable by simply disconnecting the corner posts 20 from the panels 18 of the side walls 12, and adding one or more additional panels to the side walls 12.

Figure 4:
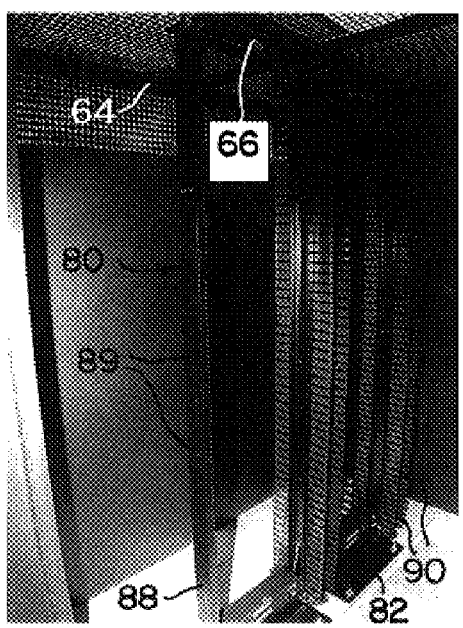
FIG. 4 is an elevation view of a vertical mounting station contained within the locker of FIG. 1.

Referring to FIGS. 4, 6, 10, and 12, the locker 10 includes a ceiling assembly 60 including a plurality of perforated panels 62 connected to respective flanges 63 of horizontally extending, upper brackets 64 that run along the upper edges of the respective panels 18 (FIG. 12). In addition, the ceiling includes support tubes 65 connected to the adjacent panels 62 via "L" brackets 66 (FIG. 4). In one illustrative embodiment, the panels 62 include upper and lower skins formed with spaced apart openings over the entire area, similar to the skins of the panels 18 described above, with the upper and lower skins being connected together in the same manner as the skins of panels 18.

Figure 7:
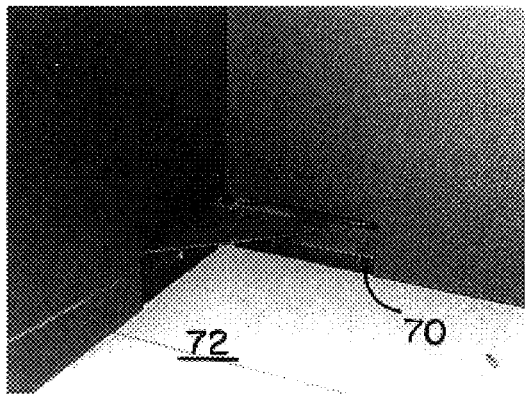
FIG. 7 is a perspective view of a lower inside corner of the locker of FIG. 1.
Figure 10:
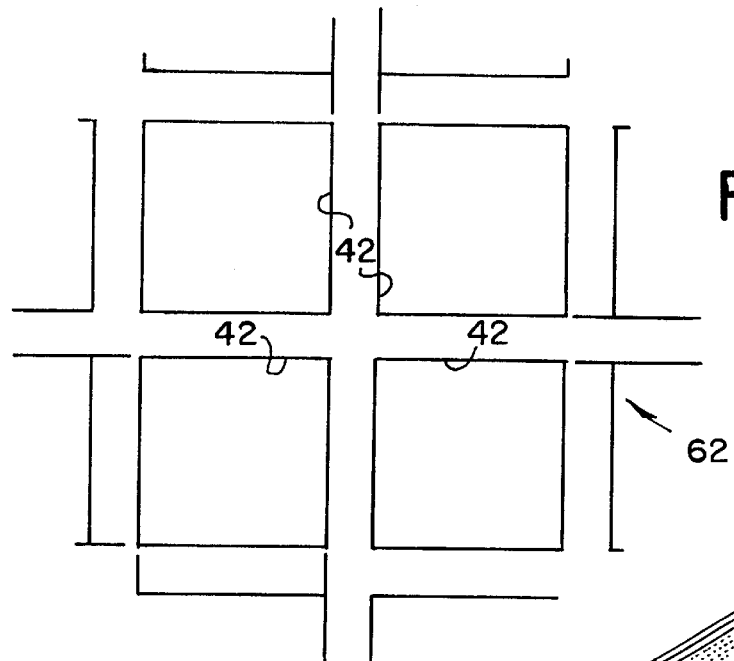
FIG. 10 is a plan view of perforations formed in the ceiling assembly of the locker of FIG. 1.
Figure 13:
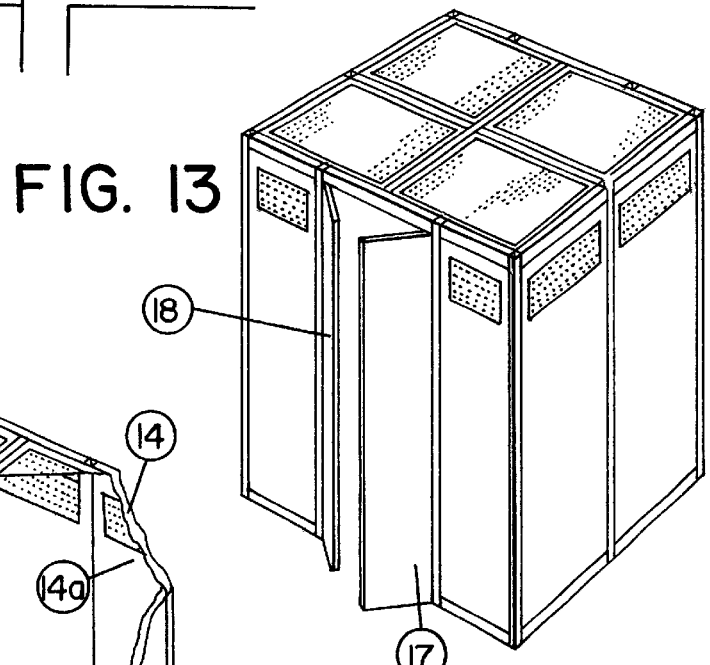
FIGS. 13–15 are various perspective views of the invention.
Figure 14:
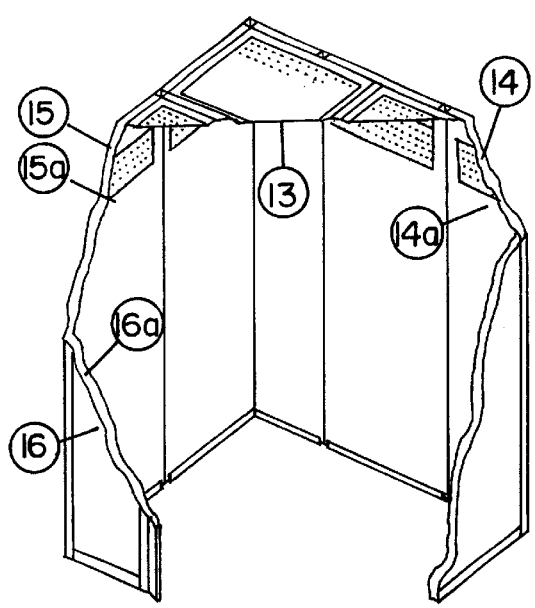
Figure 15:
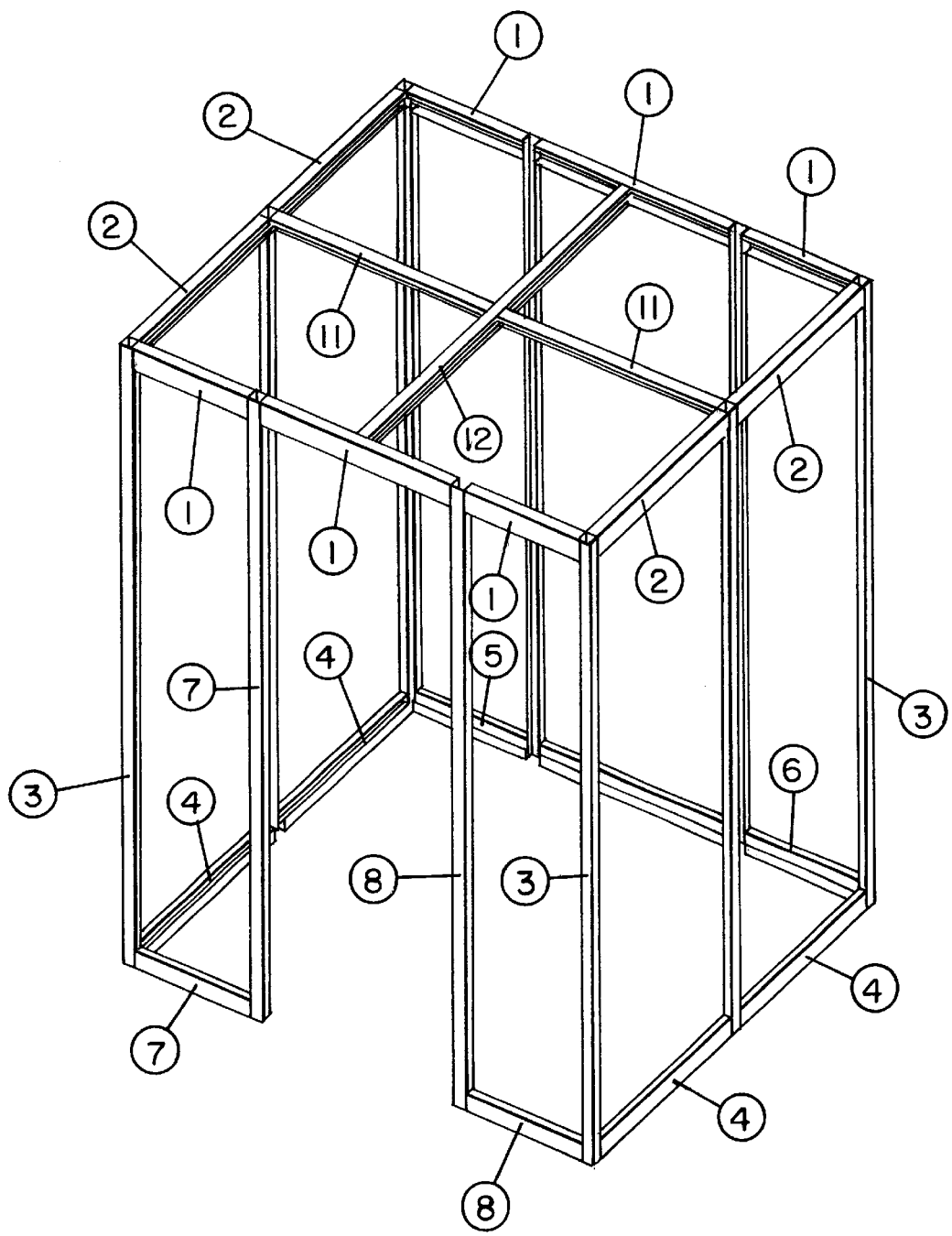

Referring to FIGS. 6 and 7, the corners of the locker 10 are reinforced with triangular-shaped reinforcing brackets 70. In one embodiment, the inner skins include cut-out segments in the upper and lower corners thereof into which the brackets are extended, with the brackets then being securely connected to the ceiling assembly 60 and to the floor 72 of the locker 10.

Figure 5:
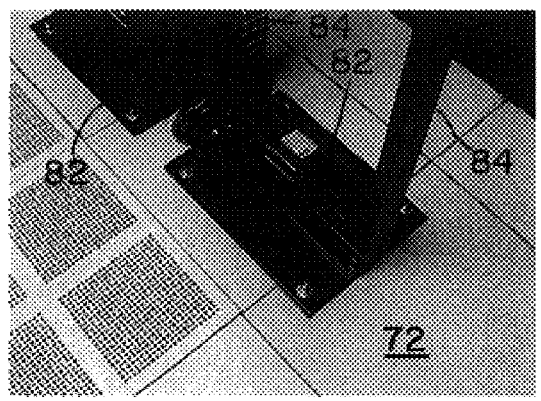
FIG. 5 is a perspective view, in enlarged scale, of a portion of the vertical mounting station of FIG. 4.

Referring now to FIGS. 4 and 5, the interior of the locker 10 includes one or more conventional vertical mounting stations 80 for mounting various computer equipment thereto. The vertical mounting stations (two of which are shown in FIG. 4) include base plates 82 connected to the floor 72, and a pair of vertical arms 84. The arms terminate at the respective upper ends in a cross member 86 that connects to one of the support tubes 64 in any conventional manner.

In one embodiment, each arm 84 is U-shaped in cross-section to define a mounting surface 88, and includes a plurality of spaced apart openings 89 formed in the surface 88 along the major portion of the surface. The openings are used to connect computer equipment to the mounting stations through the use of brackets, as is well-known to those skilled in the art.

Each mounting station 80 includes a plurality of outwardly extending, flexible fingers 90, with adjacent pairs of fingers defining openings therebetween for passing electrical wires therethrough and thereby keep the wires separate from other wires.

In one embodiment, the openings 42 in the panels 18 and 62 are 2" by 2" openings, and are spaced ½" apart. Preferably, the locker is on the order of 8 feet tall, with the openings 42 being located in the upper two feet of the locker.

It will be apparent to those skilled in the art that the security locker 10 of the present invention may be installed at a facility in any desired location, such as in a large storage room or the like. Because the security locker 10 securely stores the equipment, the remainder of the room can be used for other purposes, and access to the room does not need to be restricted.

From the foregoing, it will be apparent to those skilled in the art that the present invention provides a security locker for computer equipment which securely and conveniently stores computer equipment.

Having thus described preferred embodiments of the present invention, it is to be understood that the above-described arrangement and system is merely illustrative of the principles of the present invention, and that other arrangements and systems may be devised by those skilled in the art without departing from the spirit and scope of the invention as claimed below.

What is claimed is:

1. A security locker comprising:
   a pair of opposing side walls and a pair of opposing end walls each formed by at least one panel extending upwardly from a floor with said end walls and side walls connected together at the ends thereof, at least one of said side walls and said end walls formed by at least one panel having spaced parallel skins;
   a ventilation section formed in each of said skins of said at least one panel said ventilation sections being in-line and opposing in an upper part of each respective skin of said at least one panel with the space between said parallel skins being open in the area of said opposing ventilation sections, wherein each said opposing ventilation section includes a plurality of openings in the skin of each said ventilation section to permit air to flow therethrough from outside of said locker to the interior thereof, a plurality of support members connected between the upper ends of said panels of said opposing side walls and said end walls; and at least one ceiling panel formed by opposing skins disposed on said support members, said.

wherein each of said ceiling panels is formed by opposing skins, at least one ceiling panel having a ventilation opening therein.

2. A security locker as in claim 1 wherein there is a ventilation opening formed by an in-line ventilation section in each of the opposed skins of said at least one ceiling panel that comprises a plurality of openings.

3. A security locker as in claim 2 wherein in the said at least one panel of said end walls and said side walls said plurality of openings in one said skin forming said ventilation section are spaced apart and are offset from the openings of the opposing skin ventilation section to restrict viewing into the interior of the locker.

4. A security locker as in claim 3 further comprising at least one equipment mounting station connected between the floor and said ceiling.

5. A security locker comprising:

a pair of opposing side walls and a pair of opposing end walls each extending upwardly from a floor with said end walls and side walls connected together at the ends thereof, each of said side walls and said end walls formed by at least one panel having spaced parallel skins defining an empty space therebetween;

a ventilation section formed in each of said skins of said at least one panel said ventilation sections being in-line and opposing in an upper part of each respective skin of said at least one panel with the space between said parallel skins being open in the area of said opposing ventilation sections, wherein each said opposing ventilation section includes a plurality of openings arranged in linear columns and rows in the skin of each said ventilation section to permit air to flow therethrough from outside of said locker to the interior thereof, wherein said ventilation sections formed in said side walls and said end walls are at substantially the same height, and a ceiling disposed on the upper ends of said side walls and end walls, said ceiling having at least one ventilation opening.

6. A security locker as in claim 5 wherein said ceiling comprises at least one panel formed by opposing skins each having a ventilation opening therein.

7. A security locker as in claim 5 further comprising at least one equipment mounting station connected between the floor and said ceiling.

8. A security locker as in claim 2 wherein in the said at least one panel of said end walls and said side walls said plurality of openings in one said skin forming said ventilation section are spaced apart and are in-line from the openings of the opposing skin of said ventilation section to restrict viewing into the interior of the locker.

9. A security locker as in claim 5 wherein said at least one ventilation section of said at least one panel of said at least one end wall and side wall is adjacent to the ceiling of the enclosure.

10. A security locker as in claim 5 wherein in the said at least one panel of said end walls and side walls said plurality of openings arranged in linear rows and columns in one said skin forming said ventilation section are in-line with the openings arranged in linear rows and columns of the opposing ventilation section of the other skin.

11. A security locker as in claim 5 wherein in the said at least one panel of said end walls and side walls said plurality of openings arranged in linear rows and columns in one said skin forming said ventilation section are offset from the openings of the opposing ventilation section arranged in linear rows and columns of the other skin.

12. A security locker as in claim 5 wherein said opposing ventilation sections are of the same shape and size.

13. A security locker as in claim 12 wherein said openings are 2"×2".

14. A security locker as in claim 13 wherein said openings are spaced ½" apart.

* * * * *